(12) United States Patent
Fish et al.

(10) Patent No.: US 6,287,456 B1
(45) Date of Patent: Sep. 11, 2001

(54) FILTRATION SYSTEM WITH FILTRATE VOLUME INDICATOR

(75) Inventors: Jeffrey Eldon Fish, Dacula; Elizabeth Deibler Gadsby, Marietta, both of GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 09/420,284

(22) Filed: Oct. 18, 1999

Related U.S. Application Data
(60) Provisional application No. 60/106,356, filed on Oct. 30, 1998.

(51) Int. Cl.$^7$ .................................................. B01D 35/143
(52) U.S. Cl. ............................. 210/85; 210/86; 210/94; 210/456; 116/228; 137/558
(58) Field of Search ................................. 116/211, 227, 116/228, 264, 273; 210/86, 94, 282, 456, 315, 744, 95, 85, 87, 464, 433.1, 248; 222/36; 340/609; 137/558; 96/117.5

(56) References Cited

U.S. PATENT DOCUMENTS

| | | |
|---|---|---|
| D. 363,760 | 10/1995 | Morem et al. . |
| D. 386,041 | 11/1997 | Tanner et al. . |
| D. 390,629 | 2/1998 | Ullmann . |
| D. 406,536 | 3/1999 | Huang et al. . |
| 483,951 | 10/1892 | Williams . |
| 669,347 | 3/1901 | Quinn . |
| 803,029 | 10/1905 | Threlfall . |
| 1,924,468 | 8/1933 | Stone . |
| 2,638,581 * | 5/1953 | Marvel . |
| 3,013,431 | 12/1961 | Splettstoeser . |
| 3,834,230 | 9/1974 | Auerbach . |
| 4,116,371 | 9/1978 | Towns et al. . |
| 4,183,450 | 1/1980 | Downing et al. . |
| 4,196,081 * | 4/1980 | Pavia . |
| 4,431,533 | 2/1984 | Wrede . |
| 4,496,906 | 1/1985 | Clack . |
| 4,741,697 | 5/1988 | Herbison . |
| 4,779,456 | 10/1988 | Cantoni . |
| 4,806,912 | 2/1989 | Clack . |
| 4,895,648 | 1/1990 | Hankammer . |
| 4,986,901 | 1/1991 | Nohren, Jr. et al. . |
| 4,998,228 | 3/1991 | Eger et al. . |
| 5,076,912 | 12/1991 | Belz et al. . |
| 5,190,643 | 3/1993 | Duncan et al. . |
| 5,296,148 | 3/1994 | Colangelo et al. . |
| 5,328,597 | 7/1994 | Boldt, Jr. et al. . |
| 5,457,665 | 10/1995 | Reid . |

(List continued on next page.)

FOREIGN PATENT DOCUMENTS

| | | |
|---|---|---|
| 142324 | 5/1920 | (GB) . |
| 233457 | 5/1925 | (GB) . |
| 378291 | 8/1932 | (GB) . |
| 2162647 | 2/1986 | (GB) . |

OTHER PUBLICATIONS

DE 29805098 U1, Jun. 10, 1998, Ratner, Abstract.

Primary Examiner—Joseph W. Drodge
Assistant Examiner—Terry K. Cecil
(74) Attorney, Agent, or Firm—Christos S. Kyriakou; Nancy M. Klembus (57) ABSTRACT

A fluid filtration system includes a mechanism for monitoring and indicating the volume of fluid that has passed through a filter 30. The mechanism includes a channel 42 in communication with a reservoir 22, a portion of which is visible exteriorly of the housing 12. The channel allows a minor portion of the fluid entering the housing via inlet 14 to flow into the reservoir, while allowing the remaining portion of fluid to flow through the outlet 16. The minor portion of fluid entering the reservoir may or may not have passed through the filter. In various embodiments, the system may also include an indicator such as a float 44, a plunger 54, or dye.

19 Claims, 9 Drawing Sheets

U.S. PATENT DOCUMENTS

| | | |
|---|---|---|
| 5,458,766 | 10/1995 | Ehara et al. . |
| 5,536,394 | 7/1996 | Lund et al. . |
| 5,536,395 | 7/1996 | Kuennen et al. . |
| 5,785,844 | 7/1998 | Lund et al. . |
| 5,882,507 * | 3/1999 | Tanner et al. . |

* cited by examiner

FILTRATION SYSTEM WITH FILTRATE VOLUME INDICATOR

This application is a continuation of U.S. Provisional No. 60/106,356, filed Oct. 30, 1998.

FIELD OF THE INVENTION

The present invention relates generally to water filtration mechanisms, and more particularly to water filtration mechanisms which indicate the cumulative volume of fluid which has passed through the filter.

BACKGROUND OF THE INVENTION

There is much ongoing effort to continually improve the quality of water which is utilized for human consumption. There exist a variety of systems which improve water quality by filtering the water to remove contaminants such as chlorine, iron, biological and organic contaminants, microorganisms, lead, and the like which affect the color, taste and odor of the water. Some filtering systems provide an indication as to when the useful life of the filter has been reached, and the filter must be changed. It is important to provide an indication that a filter has reached the end of its useful life as a filter which is utilized after its effectiveness has diminished may reintroduce contaminants which are contained within the filter into water flowing through the filter. Frequently, these "end of life" indicators utilize complex mechanisms which frequently include multiple moving or electronic components to determine when the useful life of the filter has been reached. Thus, there remains a need for a simple filtration system which enables a user to easily determine when the useful life of a filter has been reached and to easily replace that filter and reset the indicator to measure the useful life of the new filter.

SUMMARY OF THE INVENTION

In response to the foregoing problems and difficulties encountered by those of skill in the art, the present invention is directed toward a fluid filtration system including a housing having an inlet and an outlet. A filter is disposed within the housing so that fluid entering the inlet must flow through the filter before exiting the housing through the outlet. Selected embodiments of the filtration system may include a diverter which diverts water from entering the inlet. A channel having at least one orifice is positioned between the inlet and the outlet so that a portion of the water flowing into the water inlet flows through the orifice and into the channel. A reservoir is in fluid communication with the channel so that fluid flowing into the channel is collected in the reservoir. In selected embodiments, at least a portion of the reservoir is visible from exteriorly of the housing. Additional embodiments of the water filtration system may further include an indicator such as a float which may be positioned within the reservoir, the indicator adapted to indicate the level of fluid contained within the reservoir. Shut-off mechanisms may further be incorporated into the system of the present invention to prevent use of the filter after it has reached the end of its useful life.

Other objects, advantages and applications of the present invention will be made clear by the following detailed description of a preferred embodiment of the invention and the accompanying drawings wherein reference numerals refer to like or equivalent structures.

DETAILED DESCRIPTION

Figure 1:
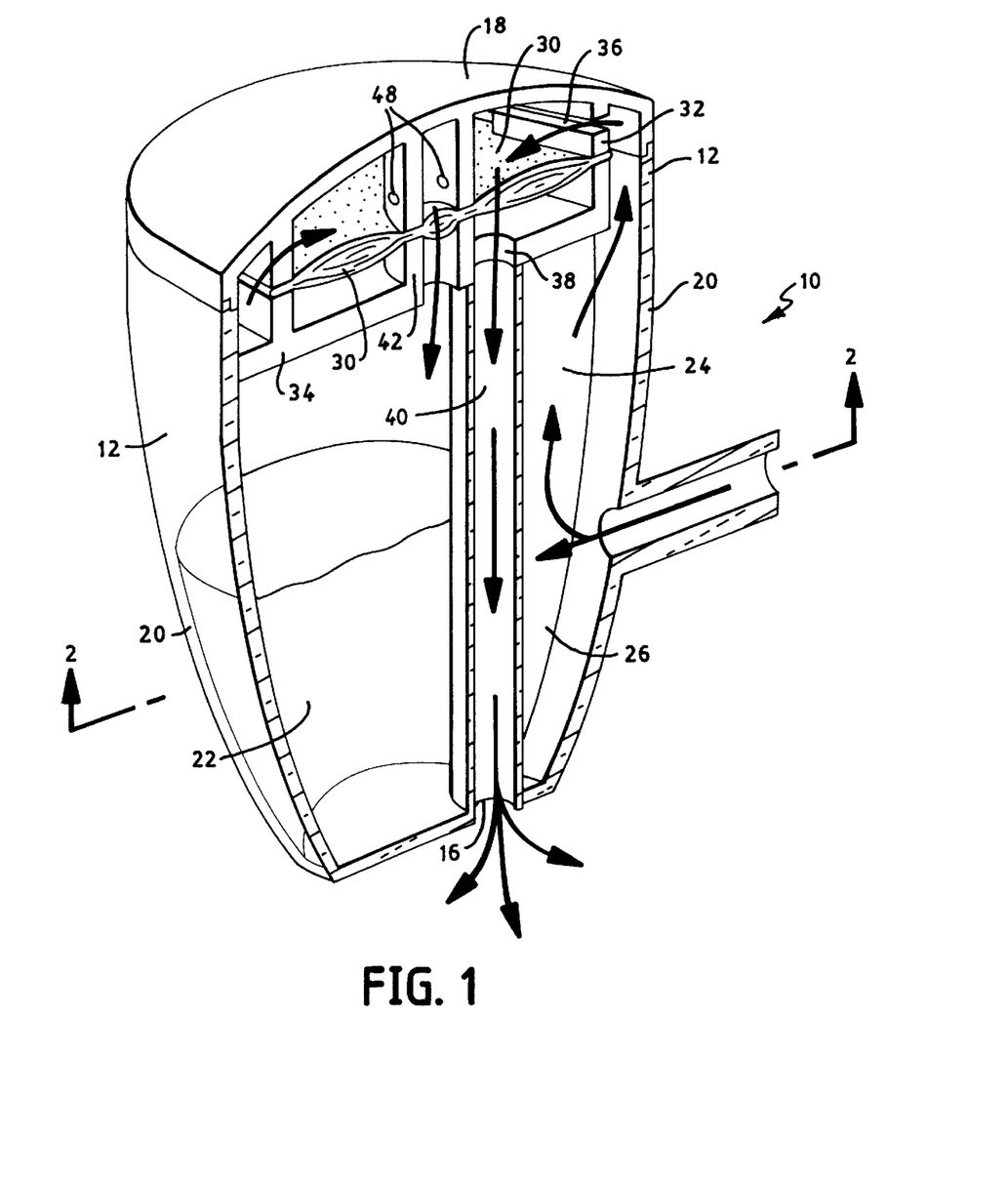
FIG. 1 is a cutaway perspective view of an embodiment of the filtration system according to the present invention.

In response to the foregoing challenges that have been experienced by those of skill in the art, the present invention is directed toward a fluid filtration system, shown at 10 in FIG. 1 in cross-section. The embodiment depicted in FIG. 1 is symmetrical about the plane through which the cross-section has been taken. The fluid filtration system 10 includes a housing 12 having an inlet 14 and an outlet 16. The inlet 14 may, in selected embodiments, be adapted to releasably engage a variety of fluid sources, such as household faucets, water coolers, water supply pipes, demijohns, pitchers and containers such as sports bottles, canteens and the like. The housing 12 may be formed into a wide variety of shapes, including a cube, rectangular solid, pyramid, cylinder, cone, sphere, egg, or any combination or variation thereof.

The housing 12 may include a lid 18 which mates to the body 20 of the housing 12. The lid 18 may be adapted to releasably engage the body 20 in a variety of ways, such as, for example, snap-fitting, rotatably engaging, press-fitting or the like. In selected embodiments, the lid 18 may additionally be releasably locked to the body 20 of the housing 12. For example, a flexible lock arm which is not readily observable to a user may be utilized to lock the lid 18 to the body 20.

Seals such as o-rings and the like may be positioned in appropriate places within the system 10 to prevent leakage. In the embodiment depicted in FIG. 3, a seal 19 is positioned within the system 10 to inhibit fluid from passing exteriorly of the housing 12 through the mating surfaces of the lid 18 and the body 20.

A variety of materials may be utilized for the housing 12, including plastics, metals, ceramics and any combination thereof. In selected embodiments, the housing 12 may be produced from a plastic such as, for example, polyethylene, polyvinylchloride, and polypropylene. In certain of such selected embodiments, at least a portion of the body 20 may be produced from a transparent or translucent material such as glass or plastics such as, for example, acrylic, polycarbonate and polyvinylchloride.

A filter 30 is disposed within the housing 12. In selected embodiments, the filter 30 may be disposed between the lid 18 and the body 20. The filter 30 is positioned within the housing 12 so that fluid entering the inlet 14 must flow through the filter 30 before exiting the housing 12 through the outlet 16. In selected embodiments, a diverter may be provided which enables a user to divert fluid away from the inlet 14 so that such fluid does not pass into the housing 12 and through the filter 30. The filter 30 may comprise a charge-modified nonwoven web, but may alternately be comprised of a wide variety of materials such as, for example, block activated carbon, granular activated carbon, various membranes, and the like. Once the filter 30 has reached the end of its useful life, the filter 30 may be replaced with a new filter or may be reused upon reconditioning of the filter 30 to restore its filtering properties.

Figure 3:
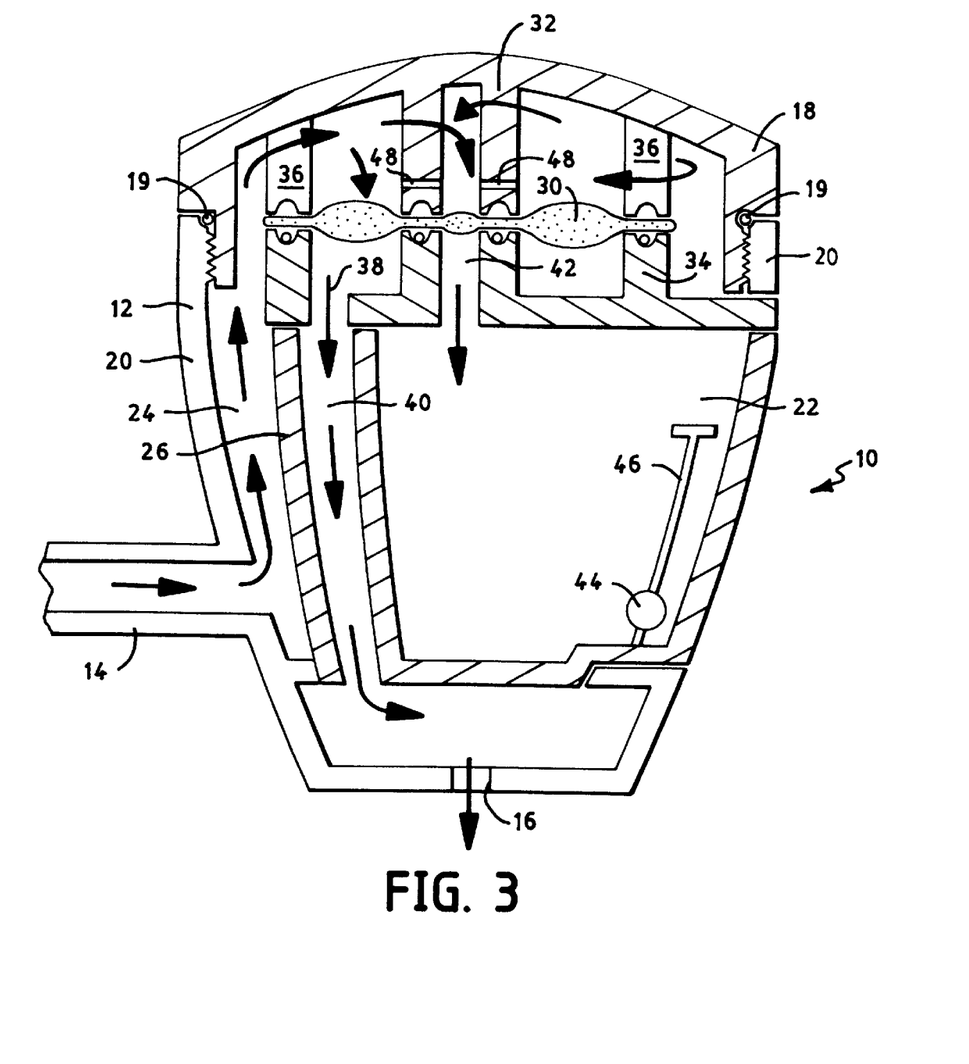
FIG. 3 is a cross-sectional view of an alternate embodiment of the filtration system according to the present invention.

As shown in FIGS. 1 and 3, an upper filter support 32 is positioned above the filter and is disposed within the lid 18. In the embodiment depicted in FIG. 1, the upper filter support is attached to the lid 18. A lower filter support 34 is positioned below the filter and is disposed in the body 20. The upper and lower filter supports 32 and 34, respectively, support the filter 30 so that fluid flowing into the filtering system 10 must pass through the filter before exiting the filtration system 10 through the outlet 16.

In the embodiment depicted in FIGS. 1 and 3, the filter 30 is disposed between the filter supports 32 and 34 so that, when the lid 18 is separated from the body 20, the filter 30 may be easily removed and a new filter 30 may be placed within the filtration system 10. In certain embodiments and as depicted in FIG. 3, the upper and lower filter supports 32 and 34, respectively, may be integrally formed with the lid 18 and the body 20, respectively. The filter supports may be formed from a variety of materials, such as, for example, the same materials as the body 20 or lid 18 or from other similar materials.

The filter supports may be variously configured to support a variety of filter types which may be utilized within the filtration system 10. For example, the upper and lower filter supports 32 and 34, respectively, may be variously positioned within the housing 12. In some embodiments, the filter supports may be positioned within the lid 18, within the body 20, or between the lid 18 and body 20. In other embodiments, the lower and upper filter supports may be formed as a single piece with the filter 30 disposed therein. For example, the filter supports may be molded directly onto the filter 30. In such embodiments, the filter unit which includes the filter supports 32 and 34 and filter 30 may be slidably or otherwise received within the housing 12 so that, at the end of the useful life of the filter 30, the filter unit may be removed from the housing 12 and a new filter unit may be placed within the housing 12. In such embodiments, the lid 18 and body 20 may be formed as a single piece.

Figure 2:
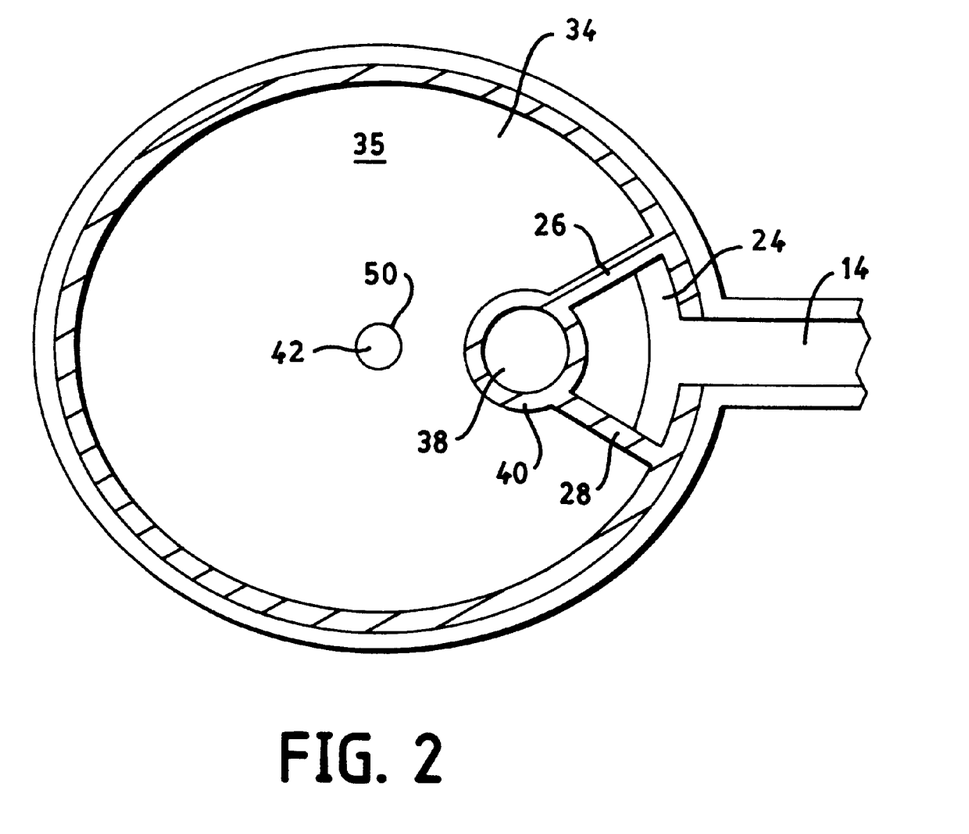
FIG. 2 is a cross-sectional view of the embodiment that is depicted in FIG. 1 in cross-section, the view in FIG. 2 taken along line 2—2.

As depicted in FIGS. 1–3, the body 20 of the housing 12 has two chambers disposed therein; a reservoir 22 and a flow chamber 24. As shown in FIGS. 1 and 2, walls 26 and 28 separate the reservoir 22 from the flow chamber 24. Fluid enters the filtration system 10 through the inlet 14 which is in fluid communication with the flow chamber 24. After entering the flow chamber 24, the fluid is forced upward through the flow chamber 24 and into the lid 18. As best shown in FIG. 1, the upper filter support 32, which is positioned within the lid 18, includes a plurality of flow apertures 36 which permit fluid flowing into the lid 18 to pass through the flow apertures 36 and into the inner portion of the upper filter support 32. The fluid within the inner portion of the upper fluid support 32 may then flow through the filter 30.

The upper and lower filter supports 32 and 34 direct the fluid entering the system 10 through the filter 30 toward either the outlet 16 or the reservoir 22. As shown in FIGS. 1, 2 and 3, an outlet aperture 38 is formed through the lower filter support 34. An outlet tube 40 extends downwardly from the outlet aperture 38 through the body 20. Thus, fluid which has passed through the filter 30 and into the outlet aperture 38 flows through the outlet tube 40 and out of the filtration system 10 through the outlet 16.

As best seen in FIG. 1, the upper filter support 32 and the lower filter support 34 form a channel 42. At least one orifice 48 is formed through the walls of the channel 42. The orifices are sized and distributed about the channel 42 so that a limited amount of fluid may flow through the orifices 48 and into the channel 42, through the filter 30 into the reservoir 22.

Thus, fluid entering the housing 12 through the inlet 14 flows upward through the flow chamber 24 and into the lid 18, passing through the flow apertures 36 and into the upper filter support 32. The fluid then flows through the filter 30. A portion of this fluid may pass through the orifices 48, into the channel 42 and flow to the reservoir 22. The remainder of the fluid entering the inlet 14 flows through the filter 30 and into the outlet aperture 38, through the outlet tube 40 and to the outlet 16.

In some embodiments, the channel 42 may be positioned so that unfiltered fluid may enter the channel 42. For example, the channel 42 may extend upward through a gap in the filter 30. Alternately, the channel 42 may be in fluid communication with the inlet 14 so that fluid may enter the channel 42 and reservoir 22 without passing through the filter 30 or upper or lower filter supports 32 and 34, respectively. In such an embodiment, the channel 42 may extend between the flow chamber 24 and reservoir 22.

The amount of fluid which enters the channel 42 through the orifice 48 and the capacity of the reservoir 22 may be correlated to the useful life of the filter 30. In such a system, when the fluid within the reservoir 22 has reached a predetermined level, this indicates to the user that sufficient fluid has passed through the filter 30 so that the filter 30 has reached the end of its useful life and should be changed.

A variety of such "end of life" indicators may be utilized with the present system. In selected embodiments, a portion of the body 20 may be transparent or translucent so that a user positioned exteriorly of the housing 12 may visually determine the level of fluid contained within the reservoir 22. When the user sees that the fluid within the reservoir 22 has reached a predetermined level, the user replaces the filter 30. Additionally, a float 44 may be placed within the reservoir 22 to further indicate to the user that the filter 30 should be replaced. The float may be variously shaped, such as, for example, a sphere, disk or other such shape.

Figure 4A:
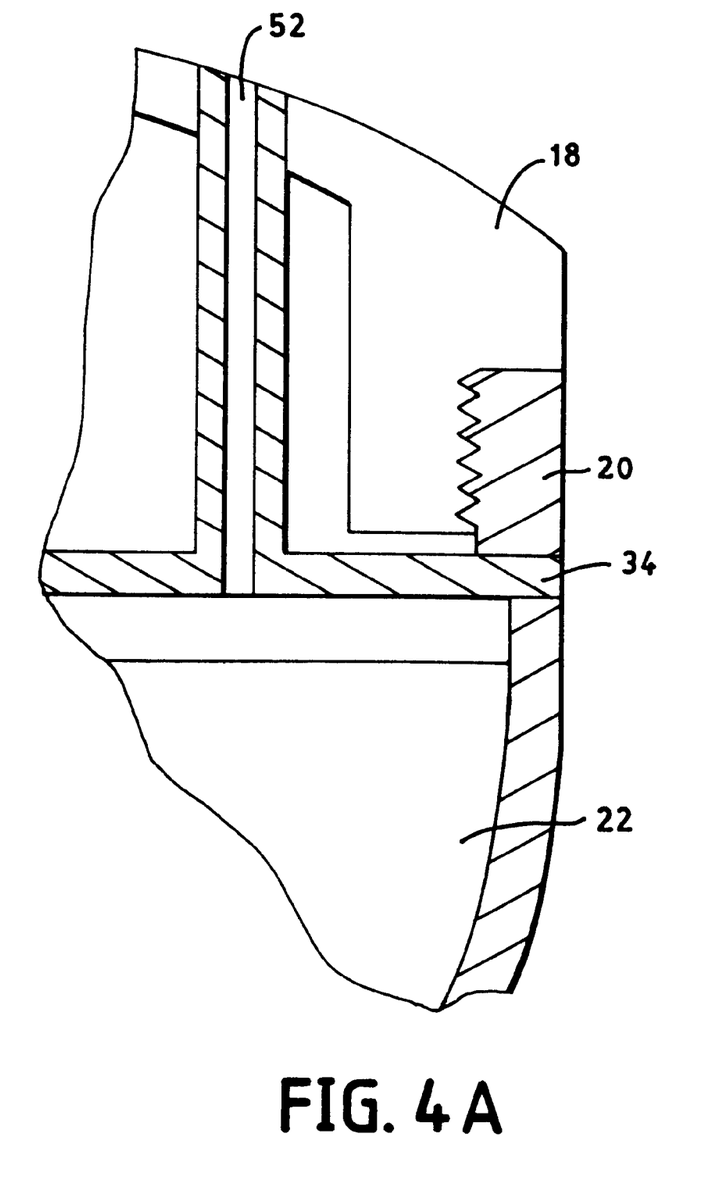
FIG. 4A is a partial cross-sectional view of a portion of the housing of the invention, the housing including an indicator passageway.
Figure 4B:
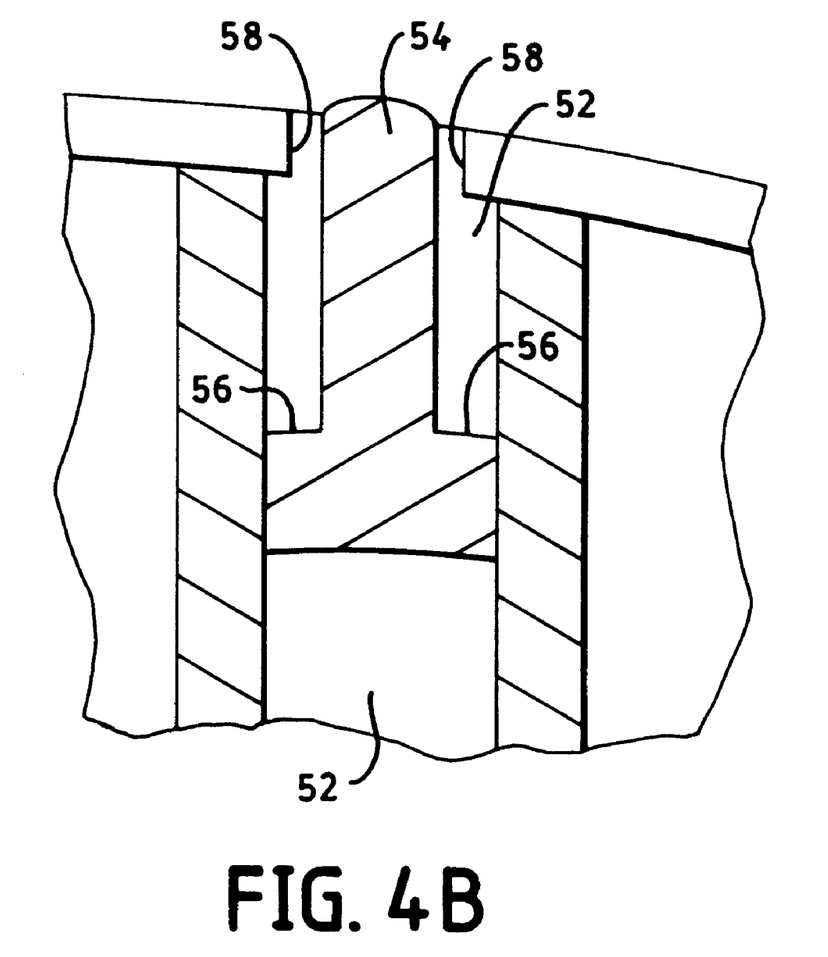
FIG. 4B is a partial cross-sectional of a portion of the housing of the invention, the housing including an indicator passageway and a plunger.

Alternate configurations of indicators may be utilized in the present invention. As depicted in FIG. 4A, particular embodiments may include a passageway 52 positioned within the housing 12 which extends from the reservoir 22 through the lid 18. In such embodiments, when the reservoir 22 is full, thereby indicating the end of the useful life of the filter, fluid within the reservoir 22 fills the passageway 52 and flows onto the exterior of the lid 18 of the housing 12. A user attempting to utilize the filtration system 10 will see fluid flowing out through the device and know that the filter 30 should be changed. As depicted in FIG. 4B, a plunger 54 may be positioned within the passageway 52. In such a system, the fluid which rises into the passageway 52 urges the plunger 54 upwardly. The plunger 54 may include a mechanism which retains the plunger 54 within the passageway 52. As shown in FIG. 4B, the plunger 54 includes a shoulder 56 which engages the edges 58 of the lid 18 when the plunger 54 is urged upwardly. Thus, the plunger 54 is retained within the passageway 52. Upon seeing the plunger 54 extending out of the passageway 52, the user is alerted to change the filter. In selected embodiments, fluid may be permitted to flow around the plunger 54 thus exiting the passageway 52 and flowing over the lid 18 of the housing 12, providing a further indication to the user that the filter 30 should be replaced.

When the filter 30 reaches the end of its useful life, the filter 30 may be replaced by the user and the reservoir 22 emptied. For example, in selected embodiments, the user would remove the lid 18 and remove the used filter 30 from between the upper and lower filter supports 32 and 34, respectively. At this time, the user would also empty the fluid which has accumulated in the reservoir 22. Depending upon the configuration of the filtration system 10, the user may remove the lower filter support 34 prior to emptying the reservoir or may merely turn the body 20 upside down to permit the fluid contained within the reservoir 22 to flow out of the channel 42.

A fresh filter 30 may then be positioned upon the lower filter support 34. The lid 18 and the upper filter support 32 may then be engaged to the body 20 and lower filter support 34. The filtration system is then ready to filter additional fluids.

Figure 5:
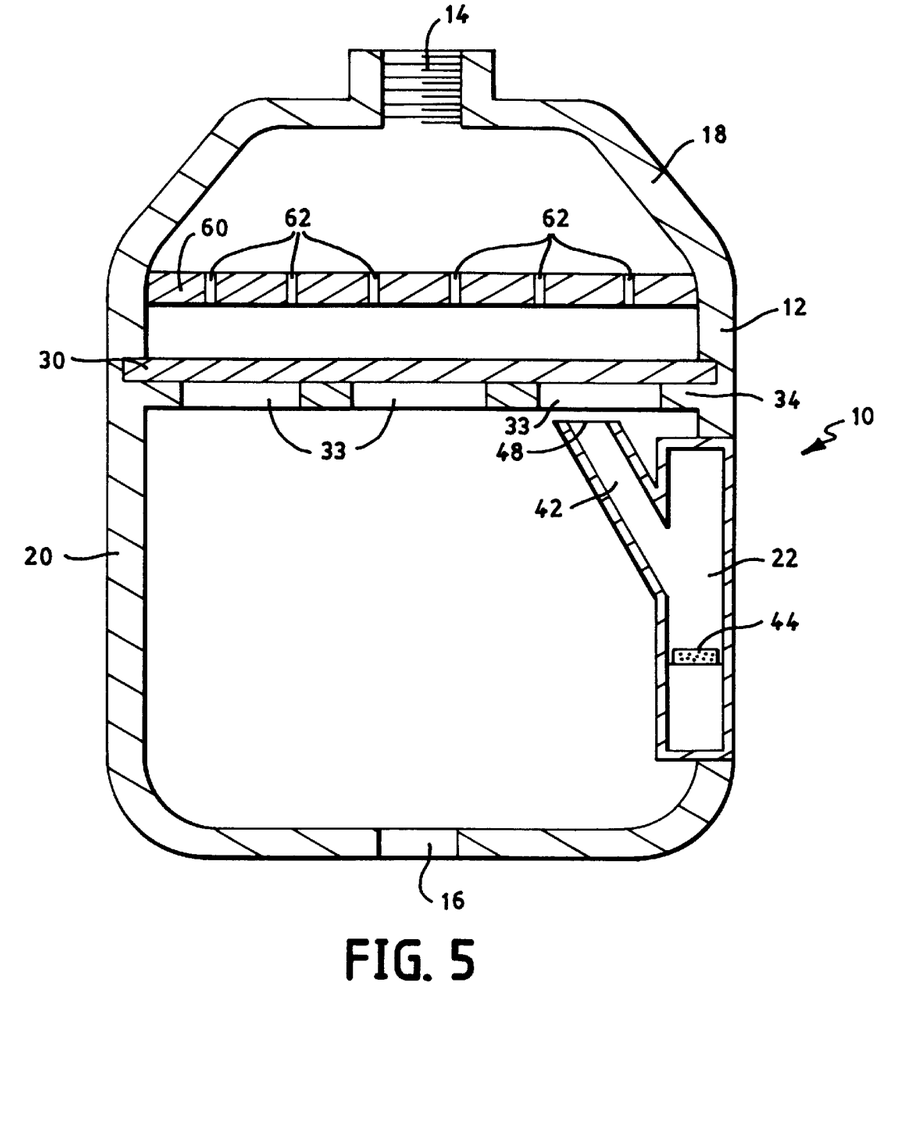
FIG. 5 is a cross-sectional view of another alternate embodiment of the filtration system according to the present invention.

The filtration system 10 which is depicted in FIG. 5 includes an inlet 14 which is positioned above the filter 30. In such a system, fluid entering the housing 12 through the inlet 14 may flow directly onto the filter 30. In the embodiment depicted in FIG. 5, a dispersing disk 60, having apertures 62 disposed therein, is positioned between the inlet 14 and filter 30. The dispersing disk 60 disperses the fluid entering the housing 12 to flow in a more uniform manner to all portions of the filter 30.

As shown in FIG. 5, a lower filter support 34 is integrally formed with the body 20, the filter 30 being supported between the lower filter support 34 and the lid 18. Apertures 33 formed in the lower filter support 34 permit fluids to flow from the inlet 14, through the body 12 and exit the system 10 through the outlet 16.

A portion of the fluid passing through the lower filter support 34 through apertures 33 may enter an orifice 48 and flow through the channel 42 and into the reservoir 22. As shown in FIG. 5, a portion of the reservoir 22 extends through the body 20 of the housing 12. The reservoir 22 may be formed of a transparent or translucent material so that a user may visually determine the level of fluid within the reservoir 22. A float 44 may also be provided within the reservoir 22 to provide a further indication of the level of fluid contained within the reservoir 22. The float 44 may be of sufficient size so that it cannot be removed from the reservoir 22 through the channel 42 and orifice 48.

When the level of fluid within the reservoir 22 has reached a predetermined level, the user may remove the lid 18 and remove the used filter 30. The user may then invert the body 20 so that the reservoir 22 may be emptied. Upon placement of a new filter 30 within the housing 12, the system 10 is ready to filter additional fluids.

Figure 6:
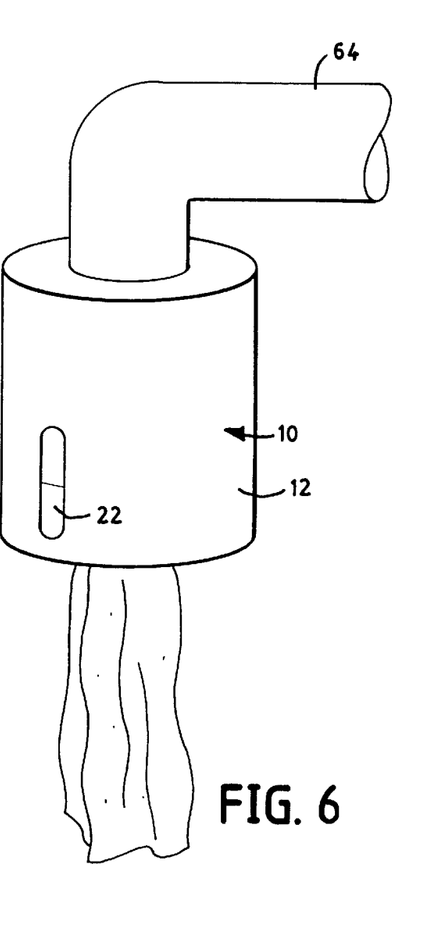
FIG. 6 is a perspective view of yet another embodiment of the filtration system according to the present invention.
Figure 7:
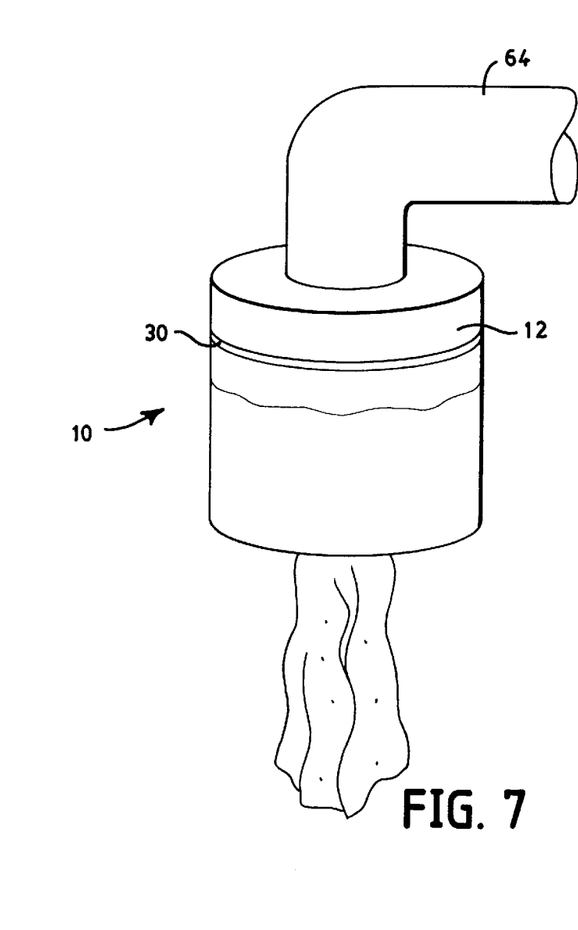
FIG. 7 is a perspective view of still another embodiment of the filtration system according to the present invention.

FIG. 6 depicts a filtration system 10 attached to a faucet 64 wherein a portion of the reservoir 22 is seen from exteriorly of the housing 12. FIG. 7 depicts a filtration system 10 attached to a faucet 64 wherein the housing 12 is formed from a translucent or transparent material so that the level of fluid within the reservoir 22 may be easily seen.

Figure 8:
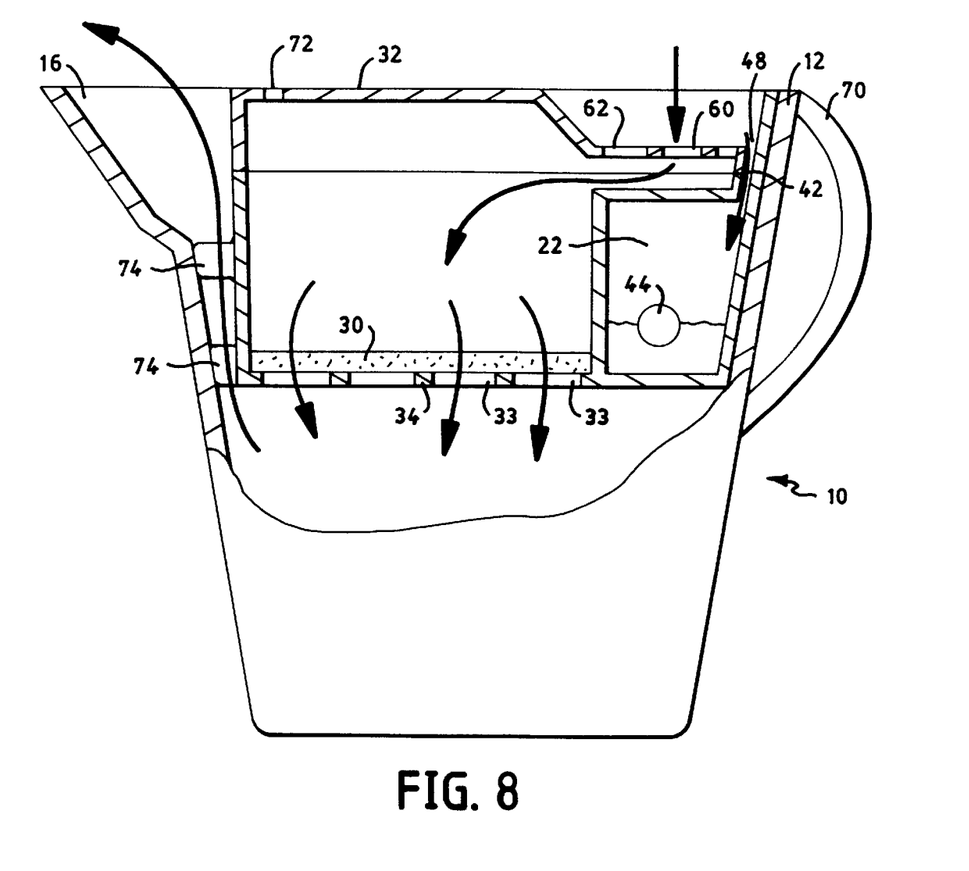
FIG. 8 is a partial cross-sectional view of an additional embodiment of the filtration system according to the present invention.

An alternate embodiment of the present invention is depicted in FIG. 8. As depicted therein, the housing 12 is formed into a pitcher having a handle 70. The filter 30 is supported by a lower filter support 34 having apertures 33 formed therein. The upper filter support 32 engages the lower filter support 34. A vent hole 72 is provided in the upper filter support 32, enabling air to escape from between the lower and upper filter supports 34 and 32, respectively.

The upper and lower filter supports and the housing are configured so that sufficient space remains below the lower filter support 34 to store water which may be later poured from the housing 12 through the outlet (or spout) 16. In the embodiment depicted in FIG. 8, the exterior surfaces of the filter supports engage the interior surfaces of the housing 12 so that the filter supports remain sufficiently spaced apart from the bottom of the housing 12. Tabs 74 are provided to enable the filter supports to engage the interior of the housing 12 while permitting filtered fluid to pass from the below the lower filter support 34 through the outlet 16.

A dispersing disk 60 is formed in the upper filter support 34, the dispersing disk having apertures 62 formed therein. A user pours fluid to be filtered onto the upper filter support 32 proximate to the dispersing disk 60 so that fluid may flow through the dispersing disk 60, through the upper filter support 32 and through the filter 30. A portion of the fluid which is introduced to the dispersing disk 60 will flow through the orifice 48 and channel 42 into the reservoir 22. As discussed above, selected portions of the housing 12 and filter supports 32 and 34 may be formed of translucent or transparent materials to enable a user to visually determine the level of fluid in the reservoir 22. A float 44 may also be positioned within the reservoir 22 to provide an additional indication to a user that the filter has reached the end of its useful life.

During replacement of the filter 30, the upper and lower filter supports, 32 and 34, respectively, may be removed from the housing 12. Upon separation of the filter supports, the filter 30 may be replaced and the fluid within reservoir 22 may be removed therefrom.

Figure 9:
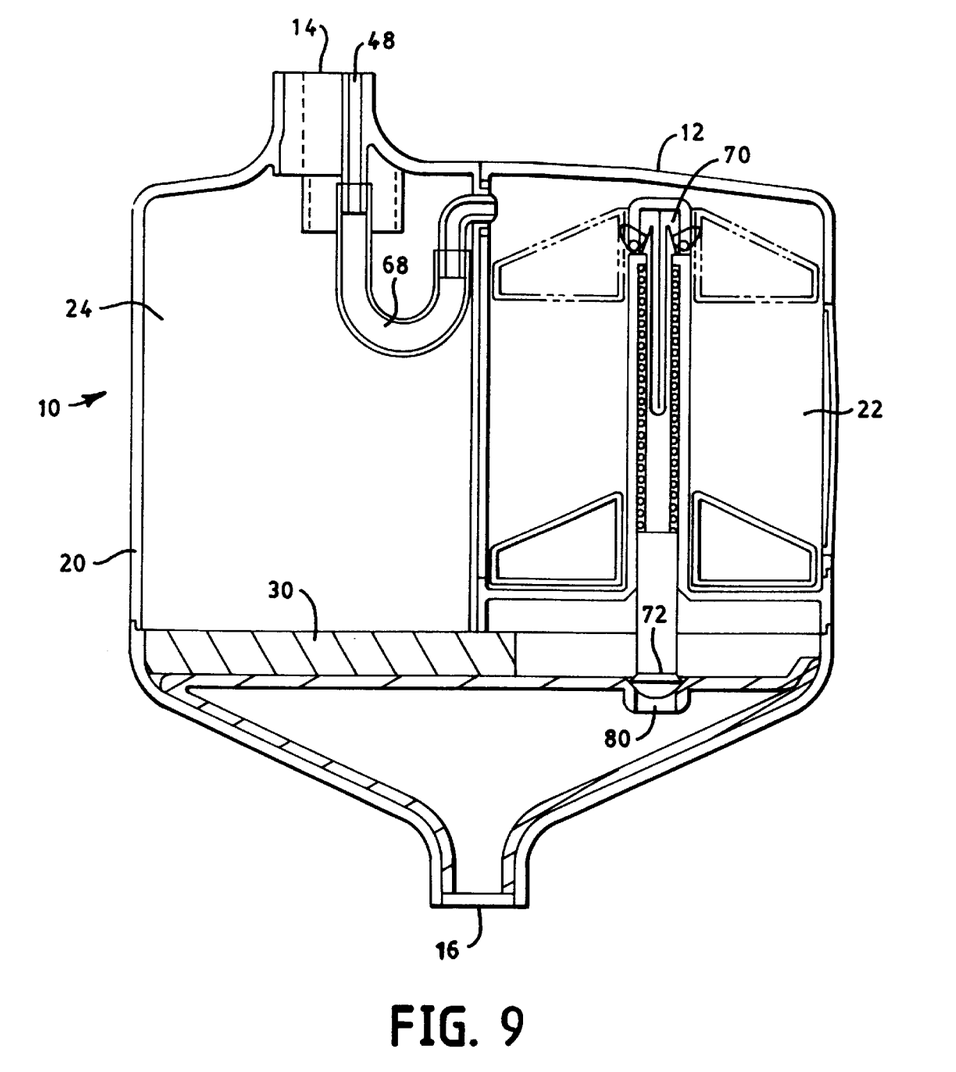
FIG. 9 is a cross-sectional view of an embodiment of the filtration system including an automatic shutoff.

The filtration system 10 may further include a shut-off mechanism which prevents the flow of water through the filtration system when the filter has reached the end of its useful life. While a variety of such shut-off mechanisms may be utilized, one such mechanism is depicted in FIG. 9. The orifice 48 is fluidly connected, via a tube 68, to the reservoir 22. Disposed within the reservoir 22 is a piston assembly 76. At the beginning of the life of the filter, the piston assembly 76 is in its uppermost position, depicted in FIG. 9 in dashed lines. Fluid entering the orifice 14 which does not enter the orifice 48 flows through the flow chamber 24, the filter 30, and exits the system 10 through the orifice 80. As a portion of the fluid entering inlet 14 passes through orifice 48, such fluid enters the reservoir 22. A variety of mechanisms may be utilized to drive the piston assembly 76 downwards until the piston head 78 engages an orifice 80, preventing any fluid from exiting through the outlet 16. When the filter 30 has been changed, fluid within the reservoir 22 may be drained to permit the filtration system 10 to provide a proper indication as to the life of the new filter 30 and also permit water to flow through outlet 16.

While the invention has been described in detail with respect to specific preferred embodiments thereof, it will be appreciated that those skilled in the art, upon attaining an understanding of the foregoing, may readily conceive of alterations to and variations of the preferred embodiments. Such alterations and variations are believed to fall within the scope and spirit of the invention and the appended claims.

What is claimed is:

1. A fluid filtration system comprising:

a housing having an inlet and an outlet;

a filter disposed within the housing so that fluid entering the inlet must flow through the filter before exiting the housing through the outlet; and a mechanism for indicating the volume of liquid that has passed through the system;

the mechanism comprising a channel disposed within the housing, the channel being disposed between the inlet and the outlet so that a portion of the fluid flowing into the inlet flows through the channel; and a reservoir disposed within the housing, the reservoir in fluid communication with the channel so that fluid flowing into the channel is collected in the reservoir, at least a portion of the reservoir being visible from exteriorly of the housing, wherein the portion of the fluid that flows through the channel flows into the reservoir and is a minor portion of the fluid that flows through the inlet and the remaining portion of the fluid that flows through the inlet flows through the filter and out the outlet.

2. The fluid filtration system of claim 1 further including an indicator.

3. The fluid filtration system of claim 2, the indicator including a passageway extending through the housing, the passageway in fluid communication with the reservoir.

4. The fluid filtration system of claim 3 further including a plunger slidably received within the passageway.

5. The fluid filtration system of claim 2, the indicator being disposed within the reservoir.

6. The fluid filtration system of claim 5, the indicator adapted to indicate the level of fluid contained within the reservoir.

7. The fluid filtration system of claim 6 wherein the indicator includes a float disposed within the reservoir.

8. The fluid filtration system of claim 6 wherein the indicator includes a dye.

9. The fluid filtration system of claim 1, the housing further including a lid.

10. The fluid filtration system of claim 1, the housing including a transparent material.

11. The fluid filtration system of claim 10, the transparent material being disposed proximate to the reservoir.

12. The fluid filtration system of claim 1 wherein the portion of the fluid that flows through the inlet, through the channel and is collected in the reservoir also flows through the filter.

13. The fluid filtration system of claim 12, wherein the minor portion of the fluid that flows through the inlet, through the channel, and into the reservoir also flows through the filter before flowing into the reservoir.

14. The fluid filtration system of claim 1 further comprising a diverter that diverts a small portion of the fluid that enters the inlet and flows through the filter to the reservoir.

15. The fluid filtration system of claim 1 wherein the housing is a pitcher.

16. A fluid filtration system comprising:

a housing having an inlet and an outlet;

a filter disposed within the housing so that fluid entering the inlet must flow through the filter before exiting the housing through the outlet; and a mechanism for indicating the cumulative volume of fluid which has passed through the filter, the mechanism comprising a channel disposed within the housing, the channel being disposed between the inlet and the outlet so that only a minor portion of the fluid flowing into the inlet flows through the channel and into a reservoir and the remaining portion of the fluid flowing into the inlet flows through the filter and to and through the outlet.

17. The fluid filtration system of claim 16 wherein the portion of the fluid that flows through the inlet, through the channel and is collected in the reservoir also is diverted by a diverter.

18. The fluid filtration system of claim 16 wherein the housing is a pitcher.

19. A fluid filtration system comprising:

a housing having an inlet and an outlet;

a filter disposed within the housing so that fluid entering the inlet must flow through the filter before exiting the housing through the outlet; and a mechanism for continuously monitoring and indicating the cumulative volume of fluid which has passed through the filter, the mechanism includes a reservoir and a channel and continuously monitors and indicates the cumulative volume of fluid that has passed through the filter by diverting a small portion of the fluid that flows through the inlet to the channel and into the reservoir for collecting the minor portion, while allowing the remaining portion of the fluid to pass through the outlet.

* * * * *